United States Patent [19]
Bentley

[11] 3,801,114
[45] Apr. 2, 1974

[54] HYDRODYNAMIC SHAFT SEAL OF THE TYPE HAVING A SERIES OF FLAT ANNULAR WASHERS

[75] Inventor: Gustavus A. Bentley, Ann Arbor, Mich.

[73] Assignee: Federal-Mogul Corporation, Southfield, Mich.

[22] Filed: Oct. 10, 1972

[21] Appl. No.: 295,964

[52] U.S. Cl. .............................................. 277/134
[51] Int. Cl. ........................ F16j 15/32, F16j 15/40
[58] Field of Search....................... 277/133, 134, 51

[56] References Cited
UNITED STATES PATENTS
1,975,170  10/1934  Olson ................................. 277/134
2,804,325   8/1957  Riesing ........................... 277/134 X
2,958,551  11/1960  Rogers ............................... 277/134

Primary Examiner—Louis R. Prince
Assistant Examiner—Robert I. Smith
Attorney, Agent, or Firm—Owen, Wickersham & Erickson

[57] ABSTRACT

Three resilient annular washers, such as polytetrafluoroethylene, are clamped into a metal case, either before or after they have been pre-formed to provide substantially frustoconical inner portions, the inner peripheries of the pre-formed washers being substantially smaller than the outer periphery of the shaft they are to engage. The first and third washers, one on the oil side of the seal and the other on the air side, respectively, have circular inner peripheries, at least the first washer providing a static seal against the shaft. A second washer, in between the other two washers, provides a non-circular inner periphery with some portions out of contact with the shaft. Pressures and pressure gradients causing hydrodynamic action are generated in the oil film at normal shaft speeds, as a result of the motion of the oil caused by adhesion to the rotating shaft through constantly changing spaces.

14 Claims, 14 Drawing Figures

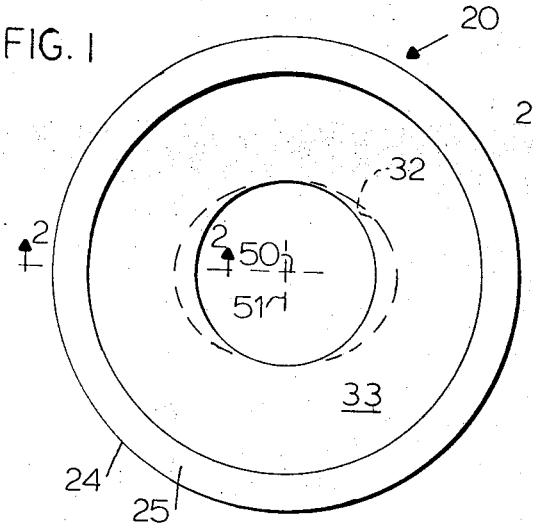
FIG. 1
FIG. 2
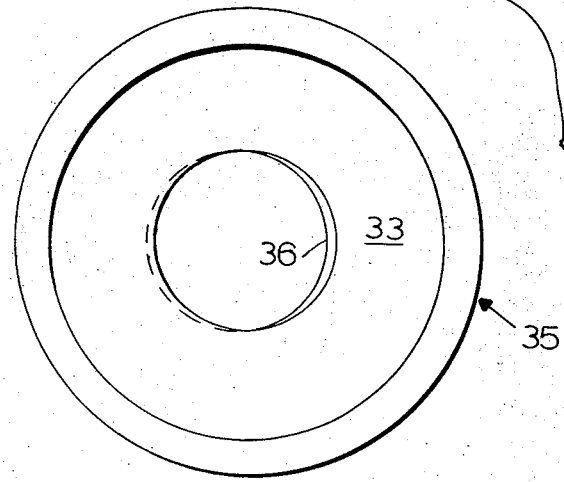
FIG. 3
FIG. 4
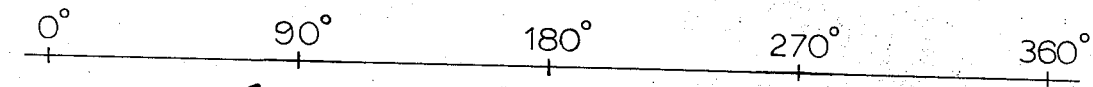
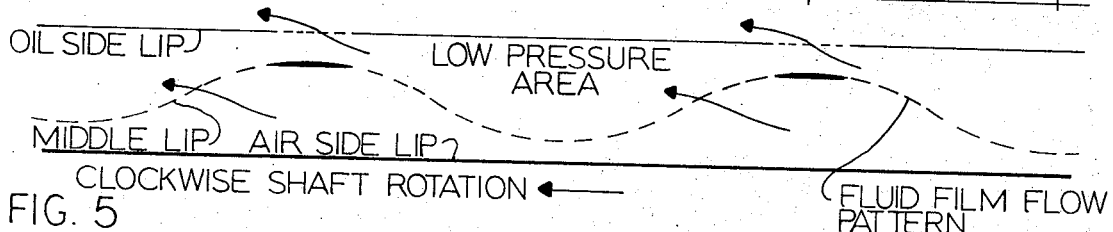
FIG. 5
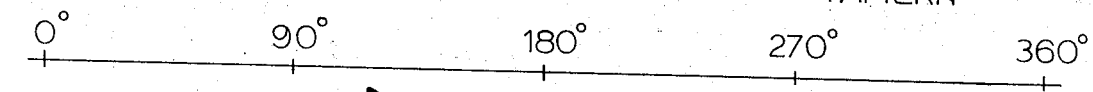
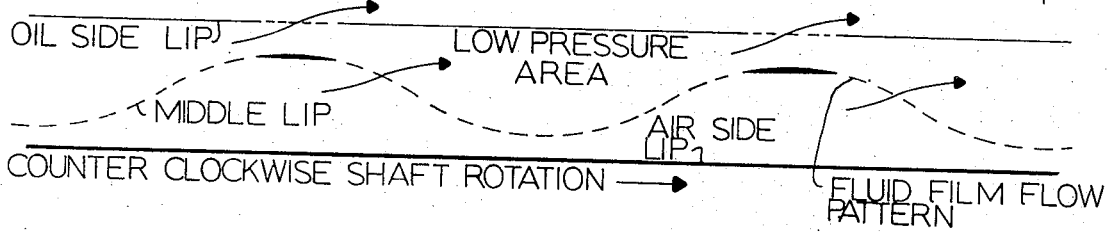

HYDRODYNAMIC SHAFT SEAL OF THE TYPE HAVING A SERIES OF FLAT ANNULAR WASHERS

BACKGROUND OF THE INVENTION

This invention relates to a shaft seal of the type having washer-type resilient sealing members, and the invention is particularly directed to making such seals hydrodynamic oil-returning devices.

The invention is especially applicable to types of materials such as polytetrafluoroethylene where it is impractical to make seals by molding a resilient thermosetting elastomeric material into a complex shape. While polytetrafluoroethylene and similar materials can be shaped by various methods, they present a different problem from such materials as butadiene styrene or acrylic elastomers, and so on. Yet they may have very valuable properties — abilities to seal liquids that react with or corrode ordinary seal components, ability to withstand extreme temperatures and ability to operate under greater-than-atmospheric pressures.

Few polytetrafluoroethylene elastomeric shaft seals have performed satisfactorily, because of the relative stiffness of polytetrafluoroethylene as compared with the synthetic rubbers and because of its inability to maintain intimate contact across asperities of the shaft surface. Materials like polytetrafluoroethylene can be used most economically when they are sliced from tubular billets, and this has led to the development of multilip seals, but it was still difficult to obtain hydrodynamic action from them. By this is meant the type of action in which the oil which has leaked past the seal is returned back to the oil side of the seal. Such leaks do not necessarily reflect upon the efficiency of the sealing member itself, but they may be caused by grooves, scratches, or other defects in the shaft upon which the seal makes contact. When there are such grooves or scratches and when oil is able to follow them out beneath the seal, then (unless hydrodynamic action can be obtained) there is leakage, and this may be serious. However, with hydrodynamic action there is no true leakage, since the oil can be returned.

Therefore, many seal users, particularly automobile manufacturers and manufacturers of other automotive equipment have been demanding that shaft seals possess hydrodynamic action, so that whether the seal itself is substantially perfect, it may in addition overcome the factors that tend to cause leakage through no fault of such seals.

The ribs, grooves and other structures that have been used in attempts to provide hydrodynamic action with most elastomeric seals are difficult to apply effectively to polytetrafluoroethylene washers, and the expense of applying them has frequently been far too great to justify doing so.

SUMMARY OF THE INVENTION

This invention applies to all shaft seals of the washer type, and is not limited to polytetrafluoroethylene as a material.

Three resilient annular washers are clamped into a metal case. Either before or after clamping, these washers are pre-formed to provide an inner frustoconical portion. The inner diameters of the preformed washers are substantially smaller than the diameter of the shaft they are to engage. In this invention the middle washer differs from the others. A first washer, which is on the oil side of the seal, is provided with a circular inner periphery. In some forms of the invention it gives a static seal upon contact with a shaft; in other forms of the invention the footprint of this washer is interrupted at the minor diameter of the middle element. This first washer does the valving for the hydrodynamic action, for the three lips cooperate to provide hydrodynamic action which returns the oil back into the main oil reservoir.

The second washer, which is the middle one and is next to the first washer, has an inner periphery that is non-circular; it may be eccentric or elliptical or wavy or irregular. If ellipitcal, for example, the second washer has at opposite ends of its major axis two portions that are out of contact with the shaft. At each end of the minor axis, the second washer is in actual contact with the shaft. This structure results, upon rotation of the shaft, in differences of pressure in the changing volume of the space between the third washer and the first washer. The pressure is greatest at the minor axis and tends at that point to return oil beneath the first washer to the oil reservoir. If the inner periphery of this second washer is circular but located eccentrically with respect to the axis of the shaft there is one point of good contact and one point with maximum distance from the shaft, and the basic operation is similar. If the middle element or second washer is wavy or irregular instead of elliptical, then there may be more than two points corresponding to the points at the ends of the major axis and more than two points corresponding to the points at the ends of the minor axis of the ellipse, but the general configuration is quite similar, as will be seen later from the drawings, and so is the operation.

The third washer is on the air side of the seal and may have a circular inner periphery; it may be exactly like the first washer, and in that instance this third washer provides the static seal; or it may differ (in some forms) by being provided with openings, which may be recessed portions of the periphery, to let air into the space between the third washer and the second washer, and in that instance, the first washer must provide the static seal. If such openings are desired, then, depending on whether the seal is to be unidirectionally or bidirectionally hydrodynamic, these openings are located in certain positions, later to be discussed, relative to the major axis or points of the periphery most distant from the shaft of the second washer. These openings let air (or oil) come in, so that the seal is assured of having atmospheric pressure at certain points, and then the pressure can build up in the irregularly shaped space lying between the first and second lips and the shaft, so as to force the hydrodynamic action. In practice, it has been found that such a seal with openings very well pumps oil that is placed on the shaft just outside the third washer right into the oil reservoir, passing beneath all three of the lips to get there. Where such pumping is not desired, the openings are not provided.

By way of analogy or comparison, a parallel may be drawn between the triple lip seal of this invention and a hydraulic radial piston pump. In the case of the seal of this invention, the continuously changing void caused by the elliptical or wavy configuration of the middle washer or middle lip provides a constantly changing cross-sectional area, which resembles the effect of the motion of the pistons in a pump cylinder. As oil is moved around this space of changing volume by the rotating shaft, the oil is alternately squeezed in the small cross-sectional areas and is subjected to a negative pressure or partial vacuum as it progresses to an area of larger cross section. The two outside lips may act somewhat like reed or flapper check valves, or, as noted, the air-side lip may have openings to let air or oil come in at certain locations. The lips are so oriented and so shaped that the oil can flow only from the air side of the seal to the oil side of the seal. Any pressure in the opposite direction tends to push the lips into more intimate contact with the shaft and to shut off the flow of oil from the oil side to the air side.

When a simple ellipse is used as the inner periphery of the middle lip, there are two diametrically opposite high pressure areas and two diametrically opposite low pressure areas located 90° on either side of the high pressure areas. As the oil progresses through these, a first high pressure region pushes the first and third lips so that they tend to move apart from each other. Because of the angle of approach to the shaft of these lips, the lip on the air side tends to be pushed against the shaft, while the lip on the oil side tends to be lifted from the shaft, so that oil on the air side of the oil-side lip is placed under pressure and thereby caused to flow toward the oil side, lifting the oil-side lip. Ninety degrees later, the outside lips are subjected to reduced pressures so that they tend to collapse toward each other. This action pulls the oil-side lip against the shaft at the same time that the air-side lip is pulled away from the shaft, except when there are openings in the air-side lip, which actually admit air or oil into the space between the two outside lips. Any oil on the air side thus tends to move into the region of low pressure between the outside lips. Another 90° later, this oil is pressurized and continues to move toward the oil side of the seal as described before. The process is continuous so long as the shaft is turning. When the seal is at rest, the oil-side lip forms a static seal when the air-side lip has openings or interruptions in shaft contact, and if the air-side lip has no openings or interruptions in shaft contact, it provides the static seal, while the oil-side lip then has interruptions in its shaft contact.

An advantage of the invention is that it makes possible the production of hydrodynamic seals from materials that are less easily elastic than conventional lip seal elastomers. For instance, as already mentioned, polytetrafluoroetylene, which is comparatively rigid, is an ideal material for making long-wearing seals that can withstand operation in fluids at temperatures up to 600° F. However, polytetrafluoroethylene seals have been unreliable and have had a tendency to leak, unless they can be made hydrodynamic, as they can by this invention.

Other objects and advantages of the invention will appear from the following description of some preferred embodiments.

BRIEF DESCRIPTION OF THE DRAWINGS

In the drawings:

FIG. 1 is a view in end elevation looking from the air side of a triple lip seal embodying the principles of the invention and providing bidirectional hydrodynamic action.

FIG. 2 is a greatly enlarged view in section taken along the line 2—2 in FIG. 1.

FIG. 3 is a view similar to FIG. 1 of a modified form of the invention employing a center lip that has an eccentrically located circular lip edge.

FIGS. 4 and 5 are diagrams indicating the hydrodynamic action of the seal of FIGS. 1 and 2 in both the clockwise shaft rotation (FIG. 4) and counterclockwise shaft rotation (FIG. 5).

DETAILED DESCRIPTION OF SOME PREFERRED EMBODIMENTS

Figure 6:
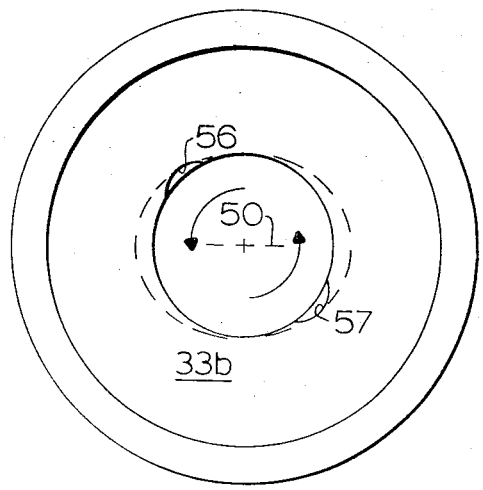
FIG. 6 is a view similar to FIG. 1 of a modified form of invention where the air-side lip has two openings diametrically opposite along a line that is displaced relatively to the major axis of the middle lip, so as to give hydrodynamic action biased toward the direction of rotation shown by the arrows.

FIGS. 1 and 2 show one preferred embodiment of this invention, namely, a hydrodynamic oil seal 20 for use on a rotating shaft 21 and designed to seal between the shaft 21 and a cylindrical bore 22. The oil seal 20 has a housing or outer case 23, preferably of metal, having a cylindrical bore-engaging portion 24 and a radially extending flange 25.

A gasket 26 may abut the inner surface of the flange 25, and an inner case 27 has a flange 28 and a cylindrical portion 29 nesting in the portion 24 of the outer case 23. The outer case 23 may have a curled-over portion 30 to hold the inner case 27 in place and to clamp three resilient washers 31, 32, and 33 toward the radial flange 25 and against the gasket 26, which seals against leakage there.

The sealing washers 31, 32, and 33 may be of polytetrafluoroethylene or may be made of plastic, elastomer, or some other kind of suitable material, and they are preferably made by cutting out annular slices from a round billet or tube or by cutting out annular pieces from flat sheets, although they can be made by fabricating individual washers from polytetrafluoroethylene powder. Each of these washers 31, 32, 33 is preformed, either before or after it is assembled into the case 23, so that it has a radially inner frustoconical portion and a flat outer portion. The three members 31, 32, and 33 shown may have slightly different basic inner peripheries 41, 42, 43 to make up the angle of bending, so that the oil-side member 31 may have the smallest inner periphery and the air-side member the largest. The frustoconical inner portions 44, 45, and 46 of these washers 31, 32, and 33 are able to flex, while the outer clamped portions 47, 48, and 49 are held between the two clamping members 25 and 28. The inner peripheries 41, 42, 43 of the seals may be ground, if desired, to make the form of lip shown in FIGS. 9 and 10, or they may be simply cut straight across when the washers are flat, as shown in FIG. 2. In this event, one corner of the oil-side lip 31 provides its sealing edge.

While the sealing edge or inner peripheries 41 and 43 of the oil-side washer 31 and air side washer 33 are circular, the inner periphery 42 of the middle lip or second washer 32 is, in this instance, a true ellipse. There need not be a very large difference between the major and minor diameters. For example, seals three inches across have had the major axis greater than the minor axis by 0.010 inch in some instances, by 0.020 inch in others, by 0.040 inch in other, and by 0.060 inch in still others, and all four dimensions gave satisfactory results. The smaller diametrical differences give higher ultimate internal pressures with decreased flow volume, due to shear force in the fluid film. Other dimensions are, of course, possible. At the major axis 50, the seal of FIGS. 1 and 2 is well out of contact with the shaft 21, while at the minor axis 51, it is, in this instance, in actual contact with the shaft 21. This is not always necessary, but is preferable. The minor axis may still have the lip somewhat retracted from the shaft, but by a smaller enough amount than that of the major axis to give the desired result. However, there are some advantages in having actual contact at this point. There is, thus, a chamber 52 between the inner portions of the first and second lips 31 and 32, and there is another chamber 53 between the second and third lips 32 and 33. However, due to the fact that the middle lip 32 is elliptical, these two chambers are joined together at the ends of the major axis 50 of the ellipse (see FIG. 1).

FIGS. 4 and 5 show how the seal 20 of FIGS. 1 and 2 provides hydrodynamic action. The lips 31, 32, and 33 are shown in solid lines where they contact the shaft 21 and the lips 31 and 32 are shown in broken lines where they do not touch the shaft 21 during rotation of the shaft at the times there is hydrodynamic action. FIG. 4 relates to clockwise rotation of the shaft 21 and FIG. 5 to counterclockwise rotation of the shaft 21. The dotted-line portions for the lip 32 indicate the portions where the elliptical shape avoids shaft contact, the width of the solid lines for all lips illustrates the degree of contact, and the curving or sinuous path of the middle lip 32 indicates a development of the ellipse, not the actual projection of the lip 32. The lip 31 is in actual contact with the shaft except at locations where the pressure in the space between the lips 31 and 33 is such as to force the lip 31 to lift enough to force back to the oil side thereof any oil in the space near the lip 31, and this pressure prevents oil from leaking past the lip 31 from its oil side. The views are, of course, diagrammatic. The heavy continuous contact pattern of the lip 33 shows how that lip acts as a static seal.

FIG. 3 shows a seal 35 that is basically similar to the seal 20, except that the middle lip 36, in between the lips 31 and 33 is circular, with its circle offset from or eccentric to the axis of the shaft 21. The results are similar to those of the seal 20, but there are only half as many low-pressure zones, half as many high-pressure zones, and only one area (instead of two) where the oil can be returned to the oil side of the lip 31 by lifting that lip.

Figure 11:
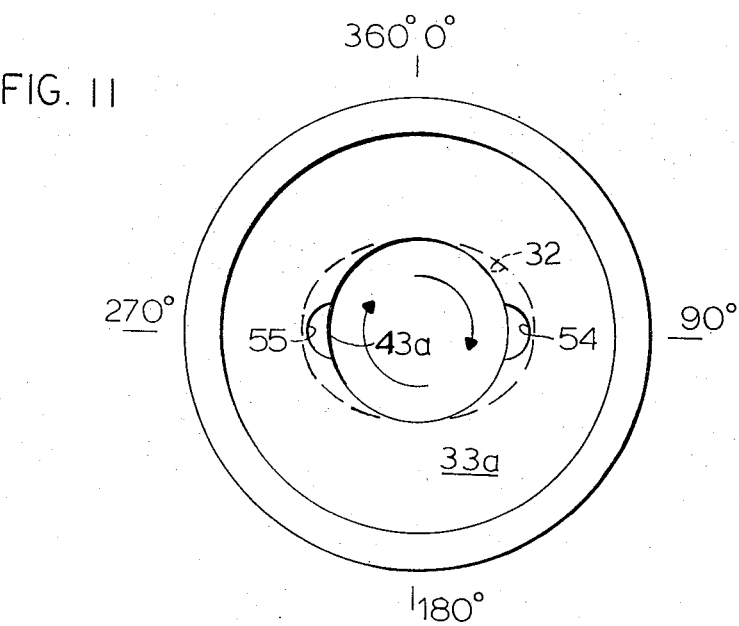
FIG. 11 is a view similar to FIG. 1 with the eccentricity of the ellipse somewhat exaggerated and with two diametrically opposite openings through the air-side lip located for bidirectional hydrodynamic action.

In FIG. 11, the air-side lip 33a has a circular inner periphery 43a in which openings 54 and 55 are provided, as by recesses in this periphery 43a. The openings 54 and 55 through the air-side lip 33a admit air freely into the chamber 53 (FIG. 2) between the second and third lips 32 and 33a, and since at these points the chamber 52 between the first and second lips 31 and 32 is also open, the openings 54 and 55 admit air into the chamber 52 (FIG. 2) too. As shown in FIG. 11, to obtain bidirectional hydrodynamic action, the openings 54 and 55 coincide in rotational position with the major axis of the elliptical middle lip 32.

Figure 7:
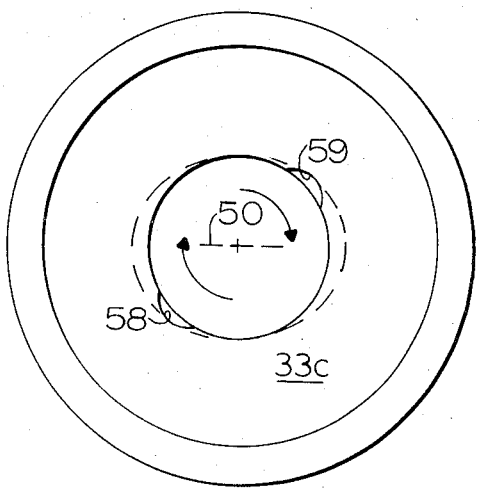
FIG. 7 is a view similar to FIG. 6 with the displacement on the opposite side to give unidirectional action in the opposite direction of rotation, as shown by the arrows.

As shown in FIGS. 6 and 7, these openings 54 and 55 may be replaced by openings 56 and 57 or 58 and 59 displaced from the major axes, when a unidirectional hydrodynamic action is more satisfactory. In other words, if the shaft is never going to rotate except in one direction, then advantage can be taken of that fact to obtain increased pumping action by displacing the openings through the third lip 33b or 33c so that they are rotationally ahead of the major axis 50 of the second lip 32. As shown in FIGS. 6 and 7, this may be about 45° ahead. Depending on actual shaft speed, the rotational positions may be varied in these instances.

The seals of FIGS. 1-3, 6-8, and 11 all prevent leakage, such as that induced by a standard rolled-groove mandrel, which is a rotating shaft with a spiral 90° V-shaped helical groove 0.003 inch deep and having a helix angle of 4°. The seals of FIGS. 6, 7, 8, and 11 will pump and will transfer fluid from the outside of the air-side lip 33a, 33b or 33c to the oil side of the oil-side lip 31, but the seals of FIGS. 1-3 will not do this. Both types of structure have their advantages and disadvantages.

For example. for an installation at the front crank position of an engine, the seals of FIGS. 1-3 are preferred becasue they will exclude moisture and contaminants that lie outside the air-side lip 33, blocking them out while also blocking in the flow of oil, whereas the seals of FIGS. 6, 7, 8, and 11 would tend to pump them into the crankcase. Also, the seals of FIGS. 1-3 are more easily assembled, for there is no necessity for orientation of the ports through the lips 33a, 33b, and 33c. In effect, the middle element 32 of the seal of FIGS. 1 and 2 acts very much like the flutes of a hydrodynamic seal of conventional design, except that the decreasing volume cavity into which the oil is squeezed is radial in the present seal rather than axial as in the conventional design.

Moreover, the continuous flow of the fluid film away from the air-side element toward and beyond the oil side element, leaves an area of negative pressure between the air-side lip 33 and the middle lip 32, as has been observed in high speed photomicrographs. The pumping action of a rolled-groove mandrel is ineffective in this region, where fluid flow is blocked by a continuous low-pressure zone, so that there can be no leakage beyond the air-side lip 33 unless oil first fills this low-pressure zone.

In the seal 20 of FIG. 1, there are two diametrically opposite high pressure areas and two diametrically opposite low pressure areas. The high-pressure areas are at the minor axis 51 and the low pressure at the major axis 50. So long as the seal is not leaking at all and no oil has passed the air-side lip 33, the air-side lip 33 acts as the seal, both statically and dynamically, that prevents the passage of oil. The lips 32 and 33 reinforce the lip 31 somewhat and give it a little stiffness. If the shaft 21 should be scratched or there should be some minor defect in either the shaft 21 or the seal 20 which permits the passage of some oil beyond the oil-side of the oil-side lip 31, then oil enters the chamber 52. Also, the minor diameter of the lip 32 forces the lip 31 off the shaft twice for each revolution of the shaft. In each high pressure region, pressure is exerted on the oil and it tends to be squeezed, while in the low pressure areas, air tends to enter to minimize the flow of oil in the opposite direction. Thus, oil on the air side tends to move into the region of low pressure between the outside lips 31 and 33, and then 90° later the oil is pressurized and continues to move toward the oil side of the seal. At the points where the lip 31 on the oil side is lifted from the shaft 21, this pressure forces the oil back in to the reservoir, and the pressure itself also prevents oil from the oil side from leaking out. At the other point, in the low pressure areas, the oil-side lip 31 is forced firmly against the shaft 21 and therefore does not permit the passage of oil at those times.

Figure 8:
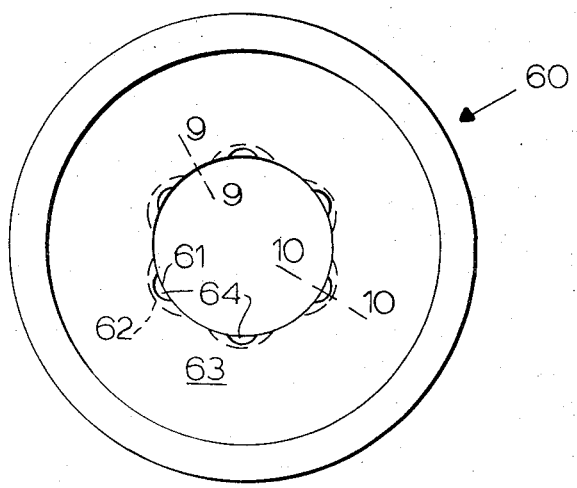
FIG. 8 is a view similar to FIG. 1 of a modified form of seal in which, instead of having an elliptical middle lip, this lip is provided with a wavy periphery; while the air-side lip has openings at locations substantially opposite the points of greatest distance of the periphery of the middle lip from the shaft, thereby giving bidirectional hydrodynamic action.

FIG. 8 shows a seal 60 generally like the seal of FIG. 11, having three lips 61, 62, and 63, but the middle lip 62 has six points at which the middle lip 62 is distant from the shaft 21 and six where it is quite close to or against the shaft 21. The oil-side lip 61 is circular, and the air-side lip 63 has six openings 64, one at each of the points where the middle lip 62 is most distant from the shaft 21. This structure may be used in quite large sealing members where it is felt that a simple ellipse would not be efficient enough. However, the ellipse has been used in seals up to six inches and has pumped very satisfactorily.

Figure 9:
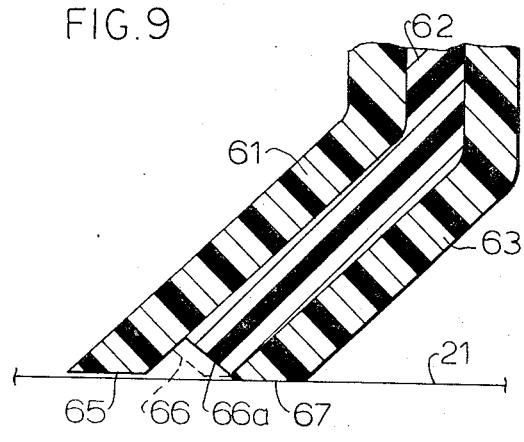
FIG. 9 is a greatly enlarged view in section, taken along the line 9—9 in FIG. 8 showing a particular lip shape for the seals at their inner periphery.
Figure 10:
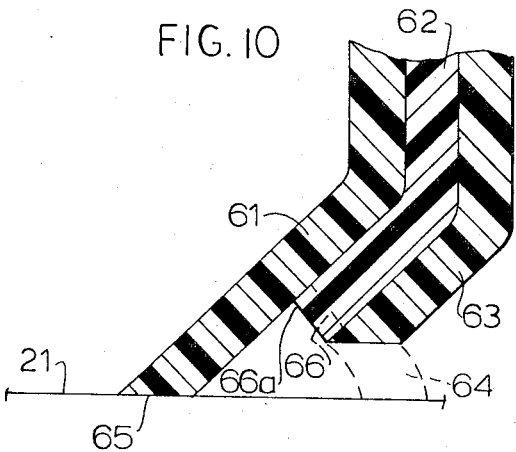
FIG. 10 is a similar view in section taken along the line 10—10 in FIG. 8.

FIGS. 9 and 10 illustrate the distance of the middle lip 62 from the shaft 21 with two different positions being shown in each view, one in broken lines at 66 with actual contact and one in solid lines 66a where the contact is barely made at the high pressure position. Similarly, the distances at low pressure are shown. The opening through the air side lip 63 is shown, and the sealing of the inner lip 61 is shown. In this instance, the lips 61 and 63 have been ground, so that there is contact along the full width of their respective peripheries 65, 67. The periphery 65 is raised out of contact with the shaft because of pressure causing flow of oil back under the periphery 65 to the oil side of the seal.

Figure 12:
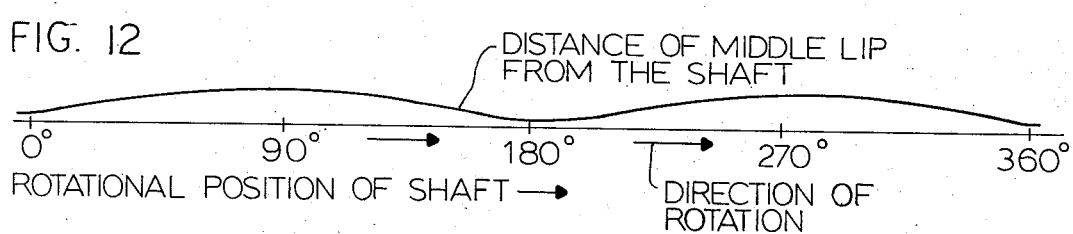
FIG. 12 is a view setting forth diagrammatically the proximity of the inner periphery of the middle lip to the shaft relative to the position of shaft rotation for the device of FIG. 11.

FIGS. 11 through 14 diagrammatically show what happens during operation of the device having holes through the lip 33a. The positions are noted on this diagram, and it will be seen that at zero or 360° is one of the points where the middle lip 32 is close to or in actual contact with the shaft and that at 90° and 270° the points of the major axis of the ellipse are reached where the middle lip 32 is the furthest away from the shaft. At 180° the lip 32 is in the same position as it is at zero and 360°. The actual proximity of a particular example is shown in FIG. 12 with the middle lip 32 being very close to the shaft at zero, 180° and 360°, diverging from the shaft up to maximum at 90° and 270°, and coming back toward it again after 90° and after 270°.

Figure 13:
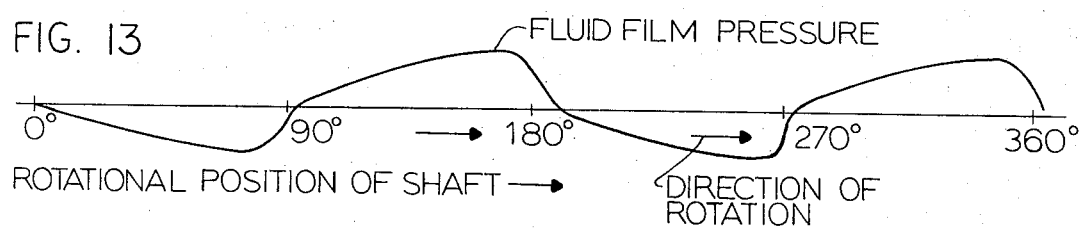
FIG. 13 is a view aligned with FIG. 12 showing the pressure variation consequent upon the proximity of the middle lip of the shaft, with fluid film pressure versus shaft rotation.

The consequent pressure variation is shown in FIG. 13, and it will be seen that the fluid film pressure varies from positive to negative relative to atmospheric along this path.

Figure 14:
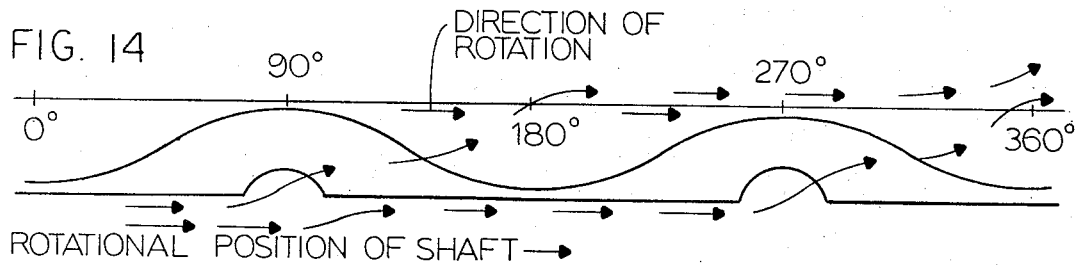
FIG. 14 is also aligned with FIGS. 12 and 13 and shows diagrammatically a flow pattern as a result of pressure variation corresponding to the shaft rotation and fluid pressure, with the points of opening through the air side shaft being indicated also.

FIG. 14 then shows the flow pattern which results from the pressure variation and illustrates also the location of the openings letting air and fluid in. It will be seen that the flow tends to be away from the air side lip and toward the middle lip and then from the middle lip toward the inner lip and that there are always the two patterns of the fluid tending to enter in that way.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A shaft seal of the type having a metal case and washer-type resilient sealing means, the seal being characterized by being capable of hydrodynamic oil-returning action and comprising:
   a cylindrical bore-engaging portion,
   three resilient annular washers, each having a radially inner frustoconical portion with a shaft-contacting edge portion and having a radially outer flat portion, said washers having their inner diameters substantially smaller than the diameter of the shaft they are to engage,
   a first said washer on the oil side of said seal having a circular inner periphery providing a static seal against the shaft,
   a second said washer next to said first washer and having an inner periphery provided with a portion well out of contact with said shaft and portions continuously approaching contact with the shaft, and
   a third said washer on the air side of said seal and having a circular inner periphery.

2. The shaft seal of claim 1 wherein the inner periphery of the third said washer is continuously circular for continuous shaft contact.

3. The shaft seal of claim 1 wherein the inner periphery of the third said washer is provided with passages for admitting air and oil into the space between said third washer and said first washer.

4. The shaft seal of claim 3 wherein said second washer has an elliptical periphery and wherein there are two said openings through said third washer located in rotational positions close to the extremities of the major axis of said elliptical periphery.

5. The shaft seal of claim 4 wherein said openings are located exactly axially in line with the extremities of said major axis, for optimal bidirectional hydrodynamic action.

6. The shaft seal of claim 4 wherein said openings are rotationally displaced somewhat from the extremities of said major axis, in the direction contour to the direction of shaft rotation, for optimal unidirectional hydrodynamic action.

7. The shaft seal of claim 1 wherein said second washer is elliptical with both extremities of the major axis thereof equally out of contact with the shaft.

8. The shaft seal of claim 1 wherein said second washer is circular and is located eccentrically with respect to the other two washers.

9. The shaft seal of claim 1 wherein said second washer has a wavy periphery with at least three portions spaced at an extreme distance from the shaft.

10. The shaft seal of claim 1 wherein said washers are polytetrafluoroethylene.

11. A shaft seal of the type having washer-type resilient sealing means and capable of hydrodynamic oil-returning action, comprising:
   a metal case having a cylindrical bore-engaging portion and a radial flange,
   three resilient annular washers, each having a radially inner frustoconical portion with a shaft-contacting edge portion and having a radially outer flat portion,
   clamping means forcing the outer portions of said washers toward said flange, to hold them in place and to prevent leakage between them and the case,
   said washers having their inner diameters substantially smaller than the diameter of the shaft they are to engage,
   said seal being characterized by said three washers comprising:
   a first said washer on the oil side of said seal having a circular inner periphery providing a static seal against the shaft,
   a second said washer next to said first washer and having an inner periphery providing at least one portion well out of contact with the shaft and smoothly and continuously joined to at least one portion in contact with said shaft, providing differences in fluid pressure as said shaft rotates, building up at the portion in contact with the shaft higher pressures in the space between its inner periphery and that of said first washer, the pressure being lower at the portion well out of contact with the shaft, and
   a third said washer on the air side of said seal and having a circular inner periphery.

12. The shaft seal of claim 11 wherein said third washer has a continuous circular periphery.

13. The shaft seal of claim 11 wherein said third washer is provided with openings adjacent the portions of the second said washer well out of contact with said shaft, for admitting air and oil into the space between said third washer and said first washer.

14. The shaft seal of claim 11 wherein said washers are polytetrafluoroethylene.

* * * * *

UNITED STATES PATENT OFFICE
CERTIFICATE OF CORRECTION

Patent No. 3,801,114          Dated April 2, 1974

Inventor(s)   Gustavus A. Bentley

It is certified that error appears in the above-identified patent and that said Letters Patent are hereby corrected as shown below:

Column 3, line 46, "polytetrafluoroetylene" should read --polytetrafluoroethylene--.

Column 5, line 7, "make up the angle" should read --make up for the angle--.

Column 5, line 19, "sealing edge" should read --sealing edges--.

Column 5, line 27, "in other" should read --in others--.

Column 8, line 65, "contour" should read --counter--.

Column 9, lines 8-9, "three portions" should read --three locations--.

Signed and sealed this 30th day of July 1974.

(SEAL)
Attest:

McCOY M. GIBSON, JR.                C. MARSHALL DANN
Attesting Officer                   Commissioner of Patents